United States Patent [19]
Fletcher et al.

[11] 4,091,665
[45] May 30, 1978

[54] MULTI-PURPOSE WIND TUNNEL REACTION CONTROL MODEL BLOCK

[76] Inventors: James C. Fletcher, Administrator of the National Aeronautics and Space administration, with respect to an invention of; Henry S. Dresser, La Mirada; Joseph J. Daileda, Torrance, both of Calif.

[21] Appl. No.: 767,911

[22] Filed: Feb. 11, 1977

[51] Int. Cl.² .............................................. G01M 9/00
[52] U.S. Cl. .................................. 73/147; 239/265.25
[58] Field of Search .................... 73/147; 239/265.11, 239/265.25, 265.27

[56] References Cited

U.S. PATENT DOCUMENTS

| 3,190,584 | 6/1965 | Gire et al | 239/265.25 X |
| 3,752,401 | 8/1973 | Kizilos | 239/265.11 X |
| 3,802,190 | 4/1974 | Kaufmann | 239/265.27 X |

*Primary Examiner*—Richard C. Queisser
*Assistant Examiner*—Joseph W. Roskos
*Attorney, Agent, or Firm*—Carl O. McClenny; Marvin F. Matthews; John R. Manning

[57] ABSTRACT

A reaction control system nozzle block is provided for testing the response characteristics of space vehicles to a variety of reaction control thruster configurations. A pressurized air system is connected with the supply lines which lead to the individual jet nozzles. Each supply line terminates in a compact cylindrical plenum volume, axially perpendicular and adjacent the throat of the jet nozzle. The volume of the cylindrical plenum is sized to provide uniform thrust characteristics from each jet nozzle irrespective of the angle of approach of the supply line to the plenum. Each supply line may be plugged or capped to stop the air supply to selected jet nozzles, thereby enabling a variety of nozzle configurations to be obtained from a single model nozzle block.

8 Claims, 5 Drawing Figures

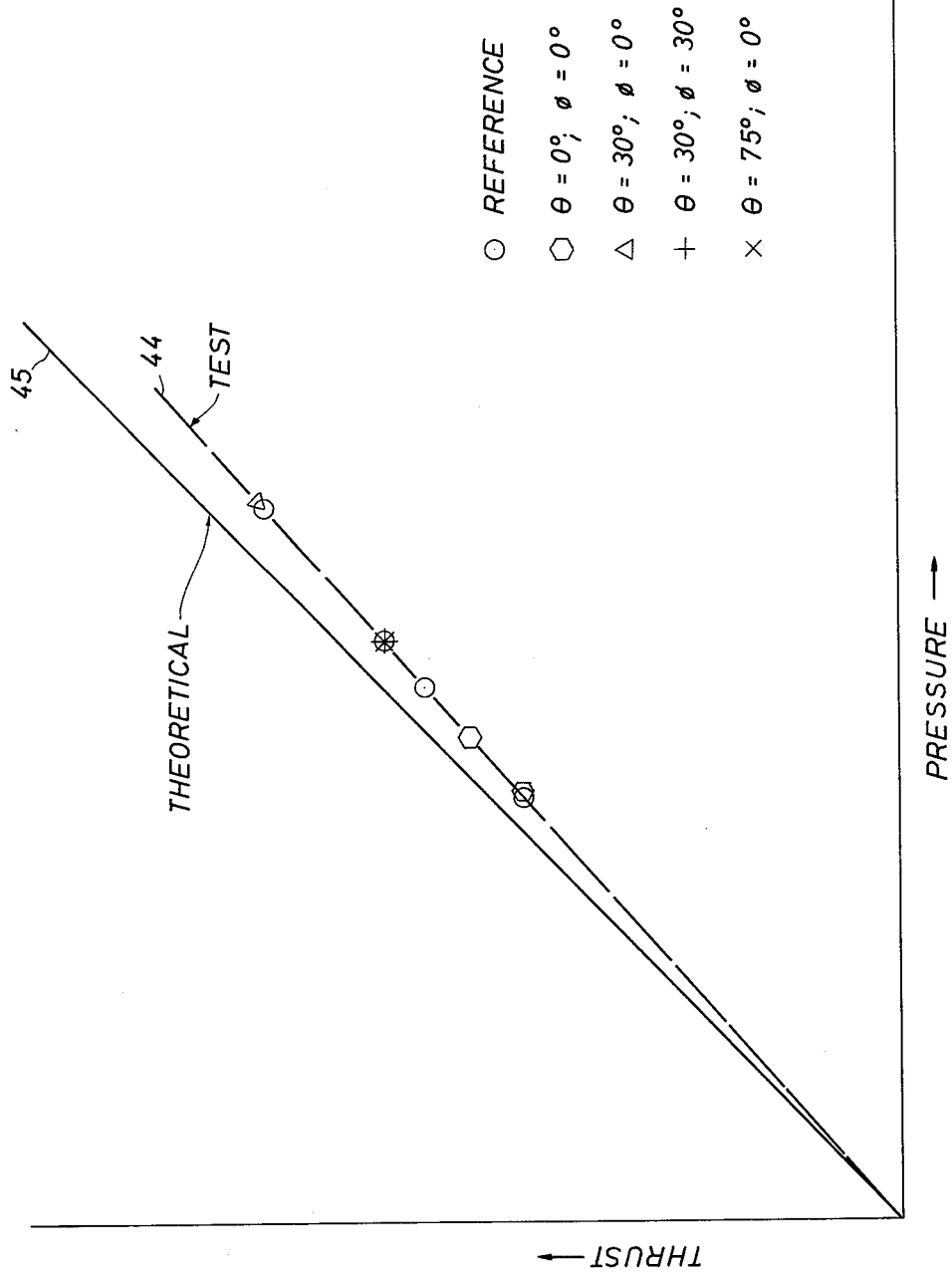

MULTI-PURPOSE WIND TUNNEL REACTION CONTROL MODEL BLOCK

ORIGIN OF THE INVENTION

The invention described herein was made in the performance of work under a NASA contract and is subject to the provisions of Section 305 of the National Aeronautics and Space Act of 1958, public law 85-568 (72 Stat. 435; 45 U.S.C. 2457).

BACKGROUND OF THE INVENTION

This invention pertains to methods and apparatus for model testing in wind tunnels and, more particularly, to method and apparatus for use in wind tunnel testing of models which utilize reaction control systems.

Reaction control systems are used to orient vehicles in flight under conditions in which aerodynamic control devices are ineffective. Such conditions particularly occur during the flight of manned and unmanned vehicles in the upper regions of the atmosphere or in space. Reaction control jets are generally placed on both the right and left sides and in the nose and aft sections of the vehicle to provide pitch, yaw, and roll control.

The design of space vehicles requires extensive testing to ascertain the flight characteristics and response of each particular vehicle design. An arrangement of reaction control jet thrusters is first defined and the response of the model to that particular configuration is experimentally determined. A variety of such configurations are designed and tested whereby the optimum performance characteristics relative to the model response to the reaction control system can be ascertained.

It has been conventional to fabricate a series of individual reaction control system model nozzle blocks each containing a particular jet nozzle thruster arrangement for each test. A large plenum was provided for each jet thruster arrangement to ensure proper flow of the thrusting medium to the nozzles. The large plenum necessitated individual nozzle blocks since individual jets could not then be controlled and, further, the size of the nozzle block would become enlarged if alternate jets were incorporated. The thrust characteristics of each test configuration had to be calibrated and the individual thrusters on each nozzle block adjusted to provide predetermined thrust characteristics.

Separate reaction control system nozzle blocks were, therefore, fabricated for each thruster configuration under consideration. Such individual fabrication and adjustment, as hereinabove discussed, is costly since the manufacture and calibration of the reaction control model test blocks requires a high degree of precision. Further, extensive model testing down-time is required to install and align each new model test nozzle block on the model.

These disadvantages of the prior art are overcome by the present invention, and an improved method and apparatus are provided for reaction control system testing of space vehicles during simulated performance testing in wind tunnels.

SUMMARY OF THE INVENTION

In a preferred embodiment of the present invention, a reaction control system nozzle block is provided for testing the response characteristics of space vehicles to a variety of reaction control nozzle configurations. A thrusting medium is supplied to a plurality of supply lines, each of which leads to a particular jet nozzle. The supply lines terminate in a cylindrical plenum volume provided immediately upstream of the throat of each jet nozzle, said cylindrical plenum being oriented perpendicular to the axis of said throat. The volume of the cylindrical plenum is selected to provide uniform thrust characteristics from each jet nozzle irrespective of the angle of approach of the supply line. A convenient means such as a plug or a cap is provided for selectively stopping the flow of thrusting medium to a jet nozzle and thereby enabling a variety of nozzle configurations to be obtained from a single model nozzle block.

It is a feature of the present invention to provide a reaction control system test nozzle block which permits a variety of jet thruster test configurations to be obtained without introducing thrust alignment errors.

It is another feature of the present invention to provide a reaction control system nozzle block whose jet thruster configuration can be conveniently altered without recalibration of the altered configuration.

It is still another feature of the present invention to provide a reaction control nozzle block wherein uniform nozzle thrust characteristics are obtained from each jet thruster.

It is yet another feature of the present invention to provide a reaction control nozzle block wherein the nozzle thrust characteristics are independent of the entrance configuration of the supply line to the nozzle.

BRIEF DESCRIPTION OF THE DRAWINGS

In order that the manner in which the above recited features of the invention are obtained can be understood in detail, a more particular description of the invention may be had by reference to the specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

IN THE DRAWINGS

Figure 1:
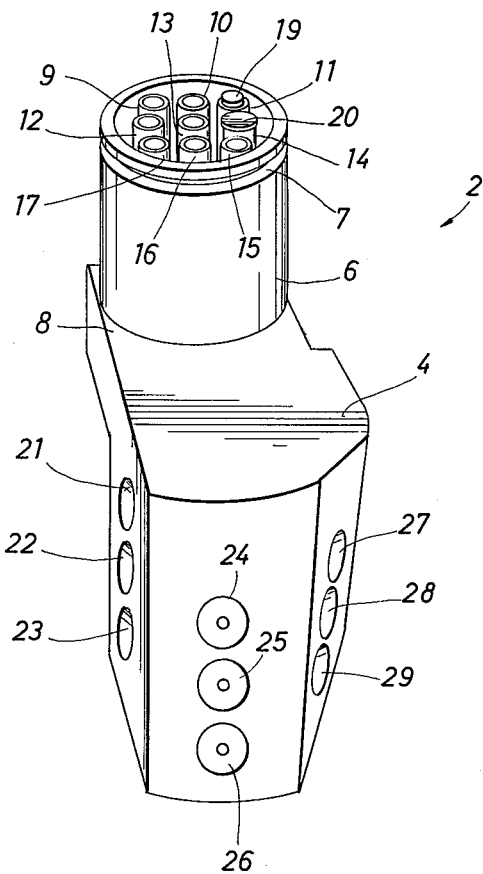

FIG. 1 is a perspective view of a reaction control system test nozzle block according to the present invention.

Figures 2, 3:
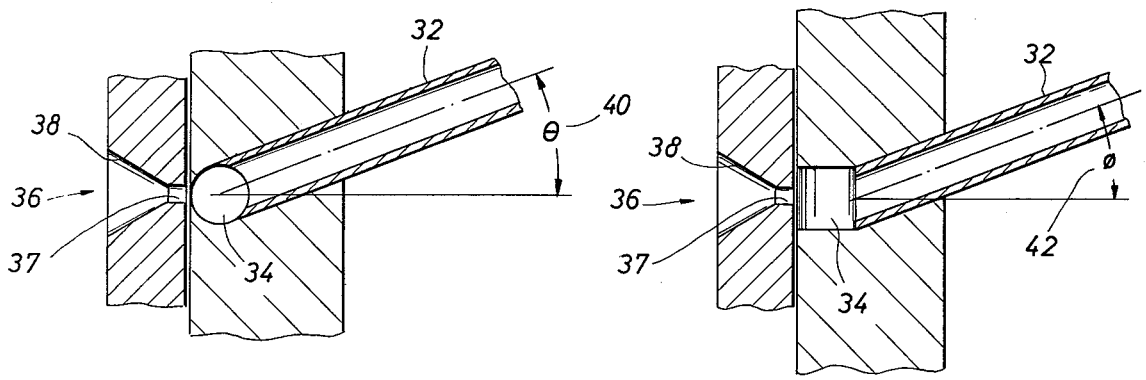

FIG. 2 is a cross-section illustrating a supply line at angle $\theta$ to the nozzle entrance plenum.

FIG. 3 is a cross-section view illustrating a supply line at angle $\phi$ to the nozzle entrance plenum.

FIG. 4 is a graph of the thrust characteristics of a reaction control nozzle for a variety of supply line approach angles.

Figure 5:
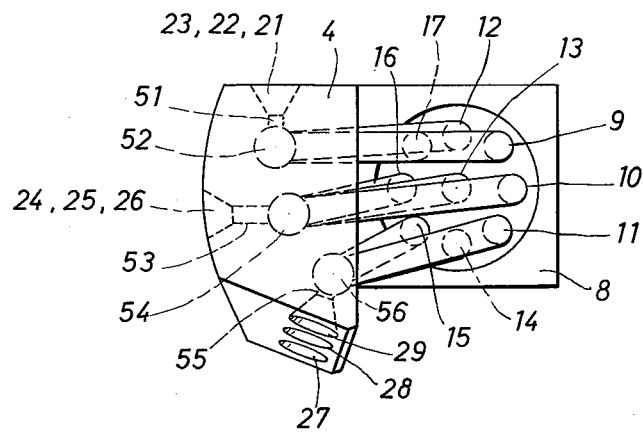

FIG. 5 is a bottom view of a reaction control system test nozzle block showing a typical orientation for the nozzle supply lines.

DETAILED DESCRIPTION OF THE PREFERRED EMBODIMENTS

Referring now to FIG. 1 there may be seen a perspective view of an assembled reaction control system test nozzle block 2. Nozzle block 4 is provided in a configuration to dispose nozzles 21 through 29 about the periphery in a configuration to obtain control of the model about the pitch, roll and yaw axes. A plurality of nozzles 21 through 29 are illustrated so that a variety of nozzle test combinations can be achieved from a single nozzle block 4. Connecting cylinder 6 surrounds supply lines 9 through 17 to align nozzle block 4 with the model being tested and to seal the entrance of the supply tubes 9 through 17 from the exterior of the cylinder 6. A seal ring groove 7 is provided for use with a conventional "O" - ring or other conventional seal rings for sealingly mating with a supply for a thrusting medium (not shown). Cylinder 6 is rigidly interconnected with nozzle block 4 by support extension 8 to ensure precise orientation of nozzle block 4 when cylinder 6 and support extension 8 are mated with the model to be tested.

A thrusting medium, generally high pressure air for model testing, is simultaneously supplied to the top openings of all of the supply tubes 9 through 17 and thereby fed to the jet nozzles 21 through 29 to which each supply tube 9 through 17 is connected. A plug 19 or a cap 20 may be provided for individually blocking the supply of the thrusting medium to selected jet nozzles and altering the particular jet thruster configuration to be provided for the test.

Referring now to FIG. 2, there may be seen a supply tube 32 entering plenum 34 at an angle $\theta$. Plenum 34 is of cylindrical configuration and is disposed immediately upstream of the throat 37 of the jet nozzle 36. It may be seen that the axis of plenum 34 is oriented perpendicular to the axis of throat 37. Angle $\theta$ is measured in a plane perpendicular to the axis of cylindrical plenum 34 and defines a first angle of approach for supply line 32.

Referring now to FIG. 3, there may be seen a cross-section elevation view of supply line 32 entering cylindrical plenum 34 at an angle $\phi$. Angle $\phi$ is measured in a plane parallel to the axis of cylindrical plenum 34 and defines a second angle of approach for supply line 32.

Referring again to FIGS. 2 and 3, a typical supply line 32 may approach the cylindrical entrance plenum 34 disposed behind jet nozzle 36 in a variety of combinations of angle $\theta$ and angle $\phi$. In a reaction control system test nozzle block, it is desirable that the thrust characteristics obtained from nozzle 36 be independent of the angles $\theta$ and $\phi$ at which supply line 32 approaches nozzle 36. Energy losses associated with the supply line and entrance configuration of plenum 34 can affect the thrust characteristics of jet nozzle 36 if the plenum volume is too small. In a nozzle block for model testing, it is desired that the design of plenum 34 be such that the degradation in thrust characteristics of nozzle 36, if any, be minimized. As more fully shown hereinbelow, a compact cylindrical plenum 34, whose diameter and height are substantially equal, provides the required uniform thrust characteristics.

It should be noted that FIGS. 2 and 3 illustrate a test configuration where jet nozzle 36 was fabricated in a separate plate which was then located in front of a selected plenum. In the reaction control system test nozzle block, other manufacturing techniques may be used in addition to forming the nozzles in a separate plate. For example, jet nozzle 36 may be formed in a solid block and plenum 34 formed by drilling a cylindrical cavity adjacent nozzle throat 37 and thereafter inserting cylindrical plugs (not shown) in the cavity space where plenum volume is not desired.

Referring now to FIG. 4, there may be seen a graph of the thrust characteristics of jet nozzle 36 in the test configuration illustrated in FIGS. 2 and 3. A reference configuration was tested comprising a large volume of thrusting medium disposed immediately behind throat 37 of jet nozzle 36 to obtain the reference thrust performance 44. A theoretical thrust performance curve 45 is also illustrated to indicate the magnitude of energy losses which occur within jet nozzle 36. A variety of supply line 32 entrance angle configurations were tested with $\theta$ varying from 0° to 30° and $\phi$ varying from 0° to 30°. It may readily be seen from FIG. 4 that the test thrust characteristics coincide with the reference thrust characteristics curve 44, indicating that the compact cylindrical plenum 34 provides the desired uniformity of jet nozzle thrust characteristics.

Referring now to FIG. 5, there may be seen a bottom view of a reaction control test nozzle block assembly 2 illustrating a typical internal arrangement and interconnection of supply lines 9 through 17 and jet nozzles 21 through 29. Typical cylindrical throat inlet plenums 52, 54 and 56 are disposed adjacent jet nozzle throats 51, 53 and 55, respectively. It is evident that supply lines 9 through 17 intersect their respective plenums in a variety of angular configurations. The method and apparatus which are the subject of the present invention ensure that the thrust characteristics of jet nozzles 21 through 29 are independent of the entrance configuration of supply lines 9 through 17. Since there is no degradation in the thrust characteristics for any particular entrance configuration, a variety of jet nozzle arrangements may be selected from the available jet nozzles 21 through 29 without any need to fabricate and calibrate each particular jet nozzle arrangement for which it is desired to obtain model test response characteristics. The alteration of the jet thruster configurations can be done in a reversible fashion by the use of removable plugs 19 or caps 20, (see FIG. 1) and the nozzle block assembly may, therefore, be re-used.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. A multi-purpose nozzle assembly for reaction control testing of wind tunnel models, comprising
    a nozzle block defining a plurality of jet nozzles disposed for control about at least one axis of said model,
    nozzle supply means for selectively connecting said jet nozzles to a thrusting medium, and
    plenum means disposed between said nozzle supply means and each said jet nozzle for obtaining thrust characteristics of each jet nozzle independent of the approach angle of said nozzle supply means.

2. The nozzle assembly described in claim 1, wherein said plenum means comprises a cylindrical cavity defined by said nozzle block and disposed adjacent and perpendicular to the throat of said jet nozzle.

3. The nozzle assembly described in claim 2, wherein the diameter of said cylindrical cavity is substantially the same magnitude as the height of said cavity.

4. The nozzle assembly described in claim 3, wherein said nozzle block defines a plurality of jet nozzles selectively oriented to provide control about the pitch, roll and yaw axes of said model.

5. The nozzle assembly described in claim 4, wherein said nozzle supply means further comprises
    a cylinder for housing said nozzle supply means, and
    sealing means for sealingly interconnecting said cylinder with a source for said thrusting medium.

6. The nozzle assembly described in claim 5, further comprising
    a plurality of supply lines interconnecting said nozzles with a thrusting medium, and means for selectively blocking the flow of said thrusting medium through said supply lines for providing a variety of nozzle configurations for model testing.

7. The nozzle assembly described in claim 6, wherein said blocking means comprises plugs removably insertable interiorly of said selected supply lines.

8. The nozzle assembly described in claim 6, wherein said blocking means comprises caps removably placed over the entrance of said selected supply lines.

* * * * *